(12) United States Patent  (10) Patent No.: US 12,497,930 B2
Karbacher et al.  (45) Date of Patent: Dec. 16, 2025

(54) INTERNAL COMBUSTION ENGINE AND METHOD FOR OPERATING AN INTERNAL COMBUSTION ENGINE

(71) Applicant: Schaeffler Technologies AG & Co. KG, Herzogenaurach (DE)

(72) Inventors: Christian Karbacher, Herzogenaurach (DE); Andreas Thoelke, Nuremberg (DE); Gerulf Pedersen, Fürth (DE); Ikechukwu Martins Onwuegbulam, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 5 days.

(21) Appl. No.: 18/722,181

(22) PCT Filed: Nov. 22, 2022

(86) PCT No.: PCT/DE2022/100873
§ 371 (c)(1),
(2) Date: Jun. 20, 2024

(87) PCT Pub. No.: WO2023/116964
PCT Pub. Date: Jun. 29, 2023

(65) Prior Publication Data
US 2025/0059929 A1    Feb. 20, 2025

(30) Foreign Application Priority Data
Dec. 21, 2021 (DE) .................... 10 2021 134 044.6

(51) Int. Cl.
*F02D 41/28* (2006.01)
*F01L 1/047* (2006.01)
(Continued)

(52) U.S. Cl.
CPC .............. *F02D 41/28* (2013.01); *F01L 1/047* (2013.01); *F01L 1/344* (2013.01); *F01L 13/0015* (2013.01); *F02D 2041/281* (2013.01)

(58) Field of Classification Search
CPC .. F02D 41/28; F02D 2041/281; F02D 41/009; F02D 41/266; F02D 2041/283;
(Continued)

(56) References Cited

U.S. PATENT DOCUMENTS 4,909,194 A * 3/1990 Bauer ................. F02D 13/0219
123/90.15

FOREIGN PATENT DOCUMENTS

DE    10236507 A1    2/2004
DE    10242659 A1    3/2004
(Continued)

*Primary Examiner* — Hung Q Nguyen

(57) ABSTRACT

The disclosure relates to an internal combustion engine having multiple camshaft control units which are connected to one another in a line by a first network topology and via which a crankshaft signal can be transmitted in unprocessed, amplified or conditioned form. The camshaft control units are designed to suppress forwarding of the crankshaft signal in a first state and to forward or to replicate the crankshaft signal and to send an additional signal in a second state. The disclosure also relates to a method for logically assigning the camshaft control units to the camshafts to be adjusted by them.

19 Claims, 2 Drawing Sheets

(51) Int. Cl.
*F01L 1/344* (2006.01)
*F01L 13/00* (2006.01)

(58) Field of Classification Search
CPC ..... F02D 2041/285; F01L 1/047; F01L 1/344; F01L 13/0015; F01L 2013/111; F01L 2201/00
See application file for complete search history.

(56) References Cited

FOREIGN PATENT DOCUMENTS

| | | | | |
|---|---|---|---|---|
| DE | 10259133 | A1 | 7/2004 | |
| DE | 102005022714 | A1 | 11/2006 | |
| DE | 102012219297 | A1 | 5/2013 | |
| DE | 102017104015 | A1 | 10/2017 | |
| DE | 102019113300 | B3 | 7/2020 | |
| DE | 102019118689 | A1 | 1/2021 | |
| JP | 2004507643 | A * | 3/2004 | ........... F02D 41/266 |
| WO | WO-9607819 | A1 * | 3/1996 | ......... B60R 16/0315 |

\* cited by examiner

INTERNAL COMBUSTION ENGINE AND METHOD FOR OPERATING AN INTERNAL COMBUSTION ENGINE

CROSS-REFERENCE TO RELATED APPLICATIONS

This application is the U.S. National Phase of PCT Application No. PCT/DE2022/100873 filed on Nov. 22, 2022, which claims priority to DE 10 2021 134 044.6 filed on Dec. 21, 2021, the entire disclosures of which are incorporated by reference herein.

TECHNICAL FIELD

The disclosure relates to an internal combustion engine with a crankshaft and multiple adjustable camshafts. The disclosure also relates to a method for assembling the internal combustion engine and preparing it for operation.

BACKGROUND

An operating method of an internal combustion engine with an electromechanical camshaft phaser is described in DE 102 59 133 A1. The camshaft phaser, an arrangement for adjusting the rotation angle relationship between a camshaft and a crankshaft of the internal combustion engine, has a modular structure in this case. Components of the arrangement are also partly used by other control and regulating devices of the internal combustion engine. A control unit of the electric motor of the camshaft phaser is connected to a second control unit, which is the engine control unit of the internal combustion engine.

Hydraulic or electromechanical camshaft phasers are mainly used as camshaft phasers. These are more complex and expensive, but compared to hydraulic camshaft phasers, among other things, they boast improved response and the advantage that the camshaft can be adjusted even when the combustion engine is at a standstill. Reference is also made to the document DE 10 2012 219 297 A1.

Further methods for operating camshaft phasers are disclosed, for example, in the documents DE 102 36 507 A1, DE 10 2005 022 714 A1, DE10 2017 104 015 A1, DE 10 2019 118 689 A1 and DE 102 42 659 A1. DE 10 2019 113 300 B3 discloses camshaft control units with two different network topologies, one of which is the CAN bus and the other bus meets real-time requirements.

To ensure that the mass forces are as low as possible, modern internal combustion engines usually have a camshaft for each row of valves. A V-engine therefore regularly has two intake and two exhaust camshafts installed. To ensure that the valve train is as variable as possible, the timing of each of the camshafts is adjustable with its own camshaft phaser. The camshaft phasers can be adjusted independently of one another and can be individually addressed by an engine control unit via the CAN bus in order to be able to represent the greatest possible variability.

Such a valve train is complex to manufacture and assemble, so it is desirable to use as many identical parts as possible. However, it is still necessary for the camshaft phasers to be individually adjustable. To do this, they must be set so that they only react to the CAN signal intended for them and set the desired target angle.

Therefore, a system architecture is known from the prior art in which each camshaft phaser has an engine including electronics and software, wherein each electric motor takes over the angle determination and the control loop of an individual camshaft. In order to enable individual targeting, different configuration data sets are stored in an electronic memory. This either requires different configurations to be available during the manufacture and assembly of the internal combustion engine. Both make production more expensive and involve the risk of confusion during assembly if the components are otherwise externally the same or similar in order to benefit from the common parts principle.

Another option is to install the same structural units and, after assembly, to store individual configuration data sets in the camshaft phasers "at the end of the line". This takes time and is complex. Furthermore, there is no guarantee about whether or not confusion will occur.

SUMMARY

The object of the disclosure is to further develop an internal combustion engine having multiple camshaft phasers with regard to the most efficient possible use of resources compared to the cited prior art. Furthermore, the disclosure is based on the object of specifying a method in which the correct assignment of the camshaft control units can be carried out as automatically as possible.

The first partial object is achieved by an internal combustion engine having the features described herein. The second partial object is achieved by a method having the features described herein. The configurations and advantages of the disclosure explained below in connection with the device also apply analogously to the operating method, and vice versa.

The internal combustion engine can be designed as a reciprocating piston engine and configured as a four-stroke engine. It has a crankshaft, which drives multiple camshafts via a control drive, by means of which the gas changes take place as part of the valve train. The angular position of the crankshaft can be determined using a crankshaft sensor. The crankshaft angle is calculated from the signal from the crankshaft sensor. The calculation can be carried out by evaluation electronics located on the sensor, in a central engine control unit or in another control unit. In an example embodiment of the disclosure, an engine control unit (ECU) makes the crankshaft signal available to other engine subassemblies. The signal can only be amplified in its signal strength and/or additionally enriched with information. Signal processing is also possible so that the crankshaft angle calculated from the crankshaft signal is distributed as a new crankshaft signal. In the latter case it can be sent digitally in the form of discrete values; in an example embodiment, it is provided as a continuous analog signal.

The internal combustion engine has multiple camshafts. For many internal combustion engines it makes sense to provide one camshaft per row of valves in order to minimize the moving masses. For example, in a V-engine according to the disclosure, two intake camshafts and two exhaust camshafts are provided.

At least some camshafts are adjustable in their phase position relative to the crankshaft by a camshaft phaser physically connected to the camshaft. The disclosure also comprises internal combustion engines in which only some of the camshafts are equipped with camshaft phasers or in which one or more camshaft phasers lack the properties described herein. A logical assignment could be hard coded for these camshaft phasers, or their logical assignment could be achieved manually.

The camshaft phasers are controlled or regulated by camshaft control units. These are usually formed by a controller, which is arranged, for example, in part of an electric motor of an electric camshaft phaser. In an example embodiment, each camshaft phaser has its own camshaft control unit. Using the camshaft control unit, the camshaft phaser can be adjusted to a target value predetermined by the engine control unit. The advantage of having a camshaft control unit locally is that the engine control unit is relieved of the computational and thermal load. Furthermore, with short signal transmission paths, the control quality increases and electromagnetic compatibility improves.

At least two, or, in an example embodiment, all camshaft control units are connected to one another in line. Connected in line means a linear network topology. This means that the camshaft control units logically form a chain, of which all chain links except the outer ones each have a predecessor and a successor. One of the initially outer chain links can be connected to the engine control unit, which then forms the beginning of the chain. The other outer chain link can remain unconnected at one end.

The first network topology can be physically specified. For this purpose, the camshaft control units are connected to one another, for example by cables. The crankshaft signal is transmitted via this first network topology, wherein in a first state of a camshaft control unit, forwarding of the crankshaft signal is prevented. In a second state, the crankshaft signal is forwarded. It can be forwarded unprocessed or amplified. It can be processed or enriched with additional information, for example by modulating. The crankshaft signal can be replicated by the camshaft control unit in the second state. As soon as the camshaft control unit forwards the crankshaft signal, it sends out an additional signal in parallel.

According to the disclosure, the predefined, linear network topology enables a delayed, logical assignment of the camshaft control units to the camshaft phasers. This means that the camshaft phasers including the camshaft control units can be provided as identical parts. Assembly is also simplified because there is no risk of mixing up camshaft phasers or camshaft control units during installation. The camshaft phasers can be physically installed together with a camshaft control unit. During assembly, however, the camshaft control unit does not know which camshaft it logically belongs to and therefore which camshaft control signal sent by the engine control unit it should respond to.

The logical assignment only takes place after assembly in a teaching process. At the beginning of the teaching process, all camshaft control units are in the first state so that no camshaft control unit is allowed to pass on the crankshaft signal.

Each camshaft control unit that receives the crankshaft signal determines the additional signals that arrive simultaneously or within a predetermined time window. If a camshaft control unit only receives the crankshaft signal within a predetermined time interval, but no additional signal, it assigns itself the logical number 1 in the linear network topology and will henceforth process camshaft control signals from the engine control unit that are intended for the first camshaft. After the logical assignment to the first camshaft, the camshaft control unit changes to the second state. In this state, it forwards the crankshaft signal and sends an additional signal in parallel. This can be information about its successful assignment; usually this will include its number.

The additional signal can also be transmitted on the first network topology. It can be transmitted on a second network topology, for example a CAN bus. The second network topology has fewer bandwidth limitations and is not limited to a linear topology. It is therefore advantageous that the second and first network topologies are physically separate and designed differently.

The camshaft control unit physically next in the first network topology receives the crankshaft signal and at the same time the information from the additional signal from the first camshaft control unit, but no further additional signal. This allows it to become aware that it is the second link in the chain and logically assign itself the number 2. Like the first camshaft control unit before, it changes from the first state to the second state and now forwards the crankshaft signal together with its own additional information. All subsequent camshaft control units operate according to the same principle and can determine their own position in the chain from the number of additional pieces of information sent or from the highest number sent. The advantage of this logical assignment according to the disclosure is that all camshaft control units can use the same software or circuit logic and their position in the chain can be determined from the hardware-coded network topology. The hardware and software of the camshaft control units can therefore be the same.

Since the total number of camshaft control units present is known, the engine control unit can end the teaching process as soon as it receives an additional signal from the last camshaft control unit. To increase robustness, instead of switching off replication, a PWM or pulse signal could also be generated in which the engine number is communicated to the following engine. This can also be provided as a fallback solution, for example if CAN reception is disrupted.

The teaching process can be initiated once after assembly or after one of the camshaft control units has been replaced. For this purpose, each camshaft control unit can be provided with a permanent data memory, for example an EEPROM, in which the information about the logical assignment is stored, so that the teaching process only has to be carried out once. When the internal combustion engine is started or restarted for the first time, the information about the logical assignment is then immediately available. Alternatively, the teaching process takes place automatically before the internal combustion engine starts if the engine control unit does not receive any information about its logical assignment from one of the camshaft control units within a predetermined time window. In another embodiment, teaching takes place before each start of the internal combustion engine.

The teaching described in this way is superior to manual assignment because the teaching only needs to be initiated centrally once. Furthermore, no physical access to the camshaft control units is required after installation. In addition, incorrect assignment, for example double assignment, is impossible. There is also little additional work involved in assembly because the camshaft control units are provided with plug connectors anyway, so the additional work is kept to a minimum.

In some internal combustion engines, different types of camshaft phasers are installed on the intake and exhaust sides. For cost reasons, only the intake camshafts are often provided with electric camshaft phasers and the exhaust camshafts with hydraulic camshaft phasers. The camshaft control units also differ. For example, in these mixed variants it is provided that only some of the camshaft control units take part in the teaching described. In the other part of the camshaft control units, their logical position can be determined in another way. Alternatively, the different types of camshaft phasers can form two chains. The teaching process according to the disclosure is then applied to each chain.

In one embodiment of the disclosure it is provided that a camshaft position is only regulated after the corresponding camshaft control unit has been logically assigned. This avoids situations in which the internal combustion engine does not start or in which damage can occur due to different cam geometries. Alternatively, control or regulation takes place in an area that allows emergency operation of the internal combustion engine.

In summary, the disclosure enables a common parts strategy in which identical camshaft phasers including camshaft control units can be installed, in that the camshaft control units themselves learn which camshaft they are mounted on and logically assigned to.

BRIEF DESCRIPTION OF THE DRAWINGS

In the following, an exemplary embodiment of the disclosure is explained in more detail with reference to a drawings. In the figures.

DETAILED DESCRIPTION

Figure 1:
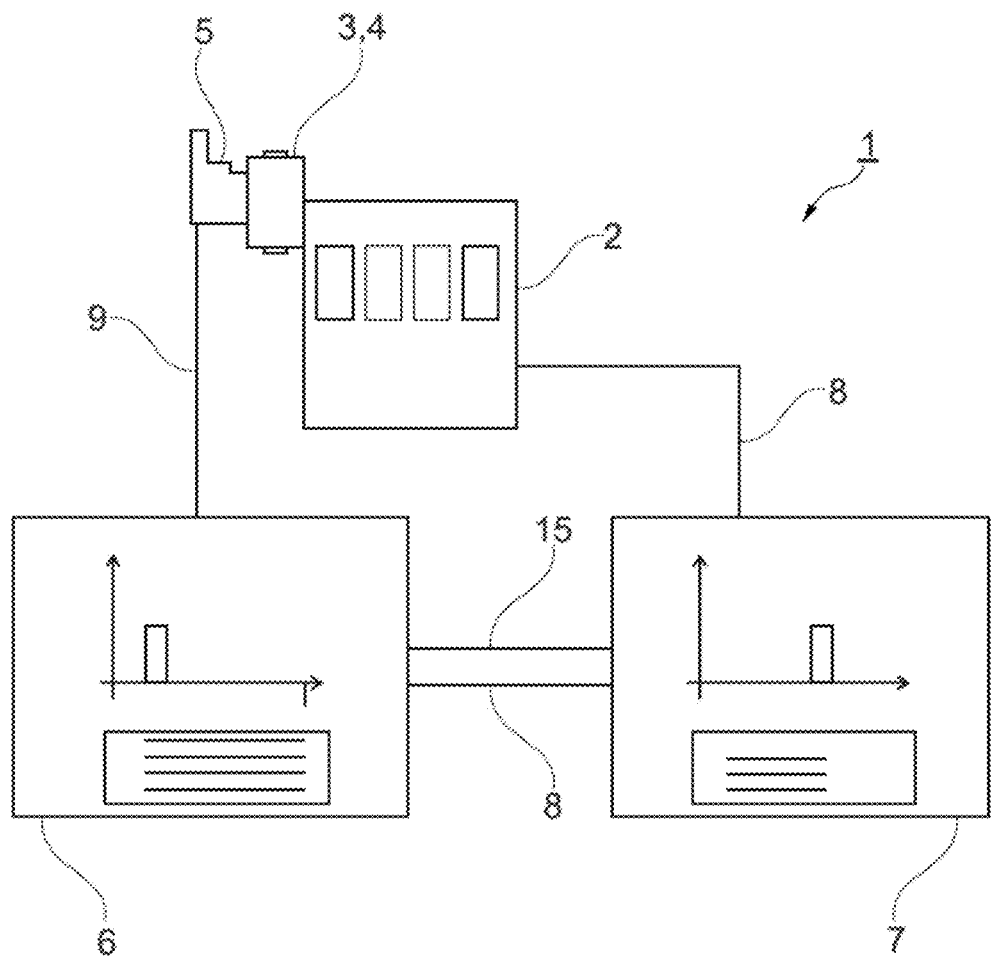
FIG. 1 shows a symbolized representation of an internal combustion engine with a camshaft phaser, a camshaft control unit and an engine control unit.

An internal combustion engine 1, shown merely symbolically in FIG. 1, the engine block of which is denoted by 2, has an electromechanical camshaft phaser 3. A setting gear 4 of the camshaft phaser 3 is designed as a triple-shaft gear mechanism, for example a harmonic drive. In this case, a first shaft of the setting gear 4 is identically or permanently connected to a belt or chain wheel and rotates in a known manner at half the crankshaft speed of the internal combustion engine 1. A second, output-side shaft of the setting gear 4 is connected in a rotationally-fixed manner to the camshaft 10 (FIG. 2) which is to be adjusted. To adjust the angle between the input-side shaft connected to the chain or belt wheel and the output-side shaft of the setting gear 4, the setting gear has a third shaft in the form of a setting shaft which is connected in a rotationally-fixed manner to the motor shaft of an electric motor 5, which is assigned to the camshaft phaser 3.

The electric motor 5 is controlled via a line 9 by the camshaft control unit 6. The camshaft control unit 6 is linked, to the engine control unit, labeled 7, of the internal combustion engine 1, via a second network topology, here a CAN bus 8. Thus, the engine control unit 7 is only burdened to a minor extent with the processing of data relating to the operation of the camshaft phaser 3.

For reasons of clarity, only one camshaft phaser 3 is shown in FIG. 1. In addition to the CAN bus 8, there is a line 15 with which the camshaft control unit 6 is linked to the engine control unit 7 and which forms part of a first network topology 16. The line 15 is used to send the crankshaft signal from the engine control unit 7 to the camshaft control unit 6. The data volume of the transmitted crankshaft signal is only a small fraction of the data transmitted between the electric-motor control unit 6 and the engine control unit 7 via the CAN bus 8. This means that, in contrast to the CAN bus 8, the information is available practically in real time using line 15.

Figure 2:
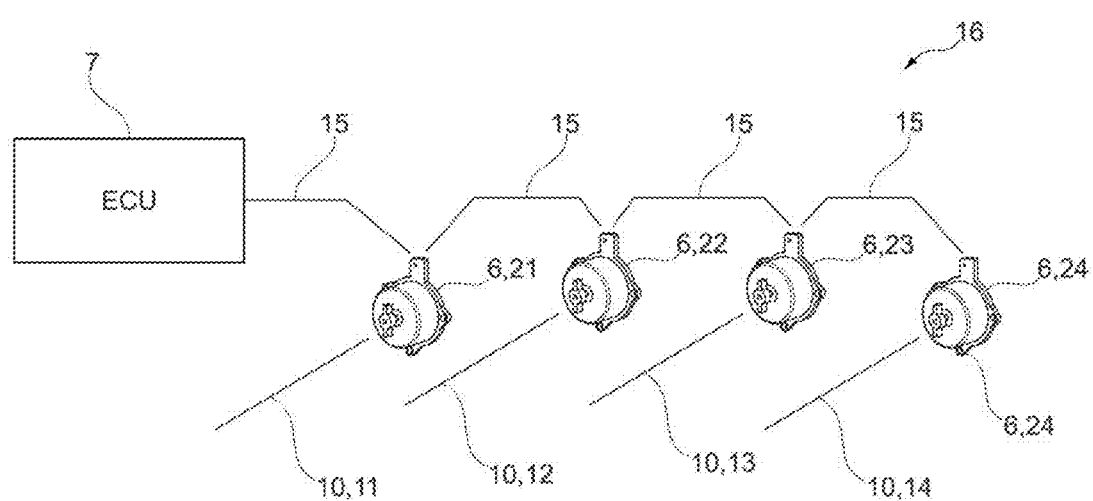
FIG. 2 shows a symbolized representation of an engine control unit that is connected to four camshaft control units via a first network topology.

FIG. 2 shows the first network topology 16 with an engine control unit 7 and four camshaft control units 21, 22, 23, 24, which are connected to one another by a line 15 designed as a cable. The camshaft control units 21, 22, 23, 24 are integrated into the respective drive motors of the camshaft phasers 11, 12, 13, 14. Together with the engine control unit 7, the four camshaft control units 11, 12, 13, 14 form a chain so that the components are connected to one another in line. For this purpose, all camshaft control units 11, 12, 13, with the exception of the last one, are connected to exactly two adjacent units, wherein the engine control unit 7 is viewed as the zeroth link in the chain. Due to the linear topology, a good order is possible, so that the order is fixed after assembly in the internal combustion engine.

The crankshaft signal, which is sent by the engine control unit 7, is fed to the camshaft control unit 11 via the line 15. The software on the drive motor can control whether replication is active or turned off. As long as the electric motors do not know their logical position (first state), they are not allowed to replicate the crankshaft signal and are not allowed to send it on the CAN bus 8 (not shown in FIG. 2).

If one of the camshaft control units 21, 22, 23, 24 receives a crankshaft signal but no CAN signal from another camshaft phaser 11, 12, 13, 14 and it is not yet logically assigned, then it will designate itself as engine number 1 and store this number internally. The camshaft control unit 21 then begins to replicate the crankshaft signal on the first network topology 16 and to send information about its number via the CAN bus 8.

If one of the camshaft control units 21, 22, 23, 24 receives a crankshaft signal, a CAN signal from the engine 1, no CAN signal from another camshaft phaser 12, 13, 14 and it is not yet logically assigned, then it will designate itself as engine number 2 and save this number internally. The camshaft control unit 22 then begins to replicate the crankshaft signal on the first network topology 16 and to send information about its number via the CAN bus 8.

If one of the further camshaft control units 21, 22, 23, 24 receives a crankshaft signal, a CAN signal from n−1 engines, no CAN signals from further camshaft phasers 11, 12, 13, 14 and it is not yet logically assigned, then it will designate itself as engine number n and store this number internally. The camshaft control unit 23, 24 then begins to replicate the crankshaft signal on the first network topology 16 and to send information about its number via the CAN bus 8.

The camshaft control units 21, 22, 23, 24 permanently store the determined engine numbers in the internal memory (EEPROM or similar) so that the learning procedure only needs to be carried out once after assembly or when replacing the engine. Alternatively, the function can also be carried out every time the engine is started. The number of camshaft control units 21, 22, 23, 24 is permanently stored in the engine control unit 7, so that an abort condition exists for this teaching process of the logical assignment.

To increase robustness, instead of switching off replication, a PWM or pulse signal can also be generated in which the engine number can be communicated to the following engine, for example if CAN reception is disturbed.

LIST OF REFERENCE SYMBOLS

1 Internal combustion engine
2 Engine block
3 Camshaft phaser
4 Setting gear
5 Electric motor
6 Camshaft control unit
7 Engine control unit of the internal combustion engine
8 CAN bus 9 Line
10 Camshaft
11 First camshaft
12 Second camshaft
13 Third camshaft
14 Fourth camshaft
15 Line
16 First network topology
21 First camshaft control unit
22 Second camshaft control unit
23 Third camshaft control unit
24 Fourth camshaft control unit

The invention claimed is:

1. An internal combustion engine, comprising:
a crankshaft, and a position of the crankshaft defined by a crankshaft angle,
a crankshaft sensor configured to provide a crankshaft signal for determining the crankshaft angle,
a plurality of camshafts, each of the plurality of camshafts having a camshaft phaser and a camshaft control unit,
a first network topology, configured to connect the camshaft control units to one another in a line and, via the first network topology, the crankshaft signal is transmitted in unprocessed, amplified, or processed form, wherein:
in a first state, the camshaft control units are configured to suppress forwarding of the crankshaft signal, and
in a second state, the camshaft control units are configured to forward or replicate the crankshaft signal and send an additional signal.

2. The internal combustion engine according to claim 1, wherein:
each camshaft control unit has a data memory configured to store information as to which one of the plurality of camshafts it is logically assigned to,
the first state is formed by a state of indeterminate logical assignment of each camshaft control unit to one of the plurality of camshafts,
the second state is formed by a state of determined logical assignment of each camshaft control unit to a one of the plurality of camshafts, and
the additional signal has information about a determined logical assignment of at least one of the camshaft control units to one of the plurality of camshafts.

3. The internal combustion engine according to claim 2, wherein at least two of the camshaft control units are configured as identical parts in hardware and software.

4. The internal combustion engine according to claim 2, wherein:
an engine control unit is connected in the first network topology to exactly one camshaft control unit, the engine control unit configured to set angles for the camshaft control units via camshaft control signals, and
a second network topology configured to send:
the camshaft control signals from the engine control unit to the camshaft control units, and
the additional signals.

5. The internal combustion engine according to claim 4, wherein the first network topology is implemented via cables, and each of the camshaft control units has a cable input and a cable output for the first network topology and the second network topology is physically separate from the first network topology.

6. A method for teaching an internal combustion engine, comprising:
providing an internal combustion engine having:
a crankshaft, a position of the crankshaft defined by a crankshaft angle,
a crankshaft sensor configured to provide a crankshaft signal for determining the crankshaft angle,
a plurality of camshafts, each of the plurality of camshafts having a camshaft phaser and a camshaft control unit,
a first network topology configured to connect the camshaft control units to one another in line and via which the crankshaft signal is transmitted in unprocessed, amplified, or processed form, and
the camshaft control units are:
configured to, in a first state, suppress forwarding of the crankshaft signal, and
configured to, in a second state, forward or replicate the crankshaft signal and send an additional signal, and
in a first configuration phase, unaware of a logical assignment to the camshaft phasers,
supplying, in a second configuration phase, a crankshaft angle signal to a first camshaft control unit in the first network topology via the first network topology, wherein the first camshaft control unit assigns its logical assignment to a first camshaft of the plurality of camshafts via the crankshaft signal with a simultaneous absence of the additional signal, and
preventing, via the first camshaft control unit, forwarding of the crankshaft angle signal until the logical assignment to the first camshaft has been made,
forwarding or replicating the crankshaft angle signal via the first network topology after the logical assignment to the first camshaft has been made, and
sending an additional signal which contains information about their the logical assignment.

7. The method according to claim 6, wherein the crankshaft angle signal is supplied to a subsequent camshaft control unit in the first network topology via the first network topology after a logical assignment of a preceding camshaft control unit is completed and the subsequent camshaft control unit carries out its logical assignment to a respective camshaft of the plurality of camshafts via the crankshaft signal as a function of the additional signal present.

8. The method according to claim 6, wherein the respective logical assignment is stored in an internal memory of the respective camshaft control unit.

9. The method according to claim 6, wherein camshaft angles of the plurality of camshafts are controlled by the camshaft control units only after the second configuration phase has been completed.

10. The method according to claim 6, wherein the internal combustion engine has an engine control unit, and a logical assignment or a logical reassignment of the camshaft control units can be achieved by an individual instruction to the engine control unit.

11. A camshaft phaser system configured for an internal combustion engine, the camshaft phaser system comprising:
a plurality of camshaft phasers configured to adjust a plurality of camshafts via a crankshaft angle signal,
a first network topology configured to connect the plurality of camshaft phasers to one another in line and, via the first network topology, the crankshaft angle signal is transmitted in unprocessed, amplified, or processed form, wherein:
in a first state, the plurality of camshaft phasers are configured to suppress forwarding of the crankshaft angle signal, and in a second state, the camshaft phasers are configured to forward or replicate the crankshaft angle signal and send an additional signal.

12. The camshaft phaser system according to claim 11, wherein the additional signal is sent via a second network topology physically separate from the first network topology.

13. The camshaft phaser system according to claim 12, wherein the second network topology is a CAN bus.

14. The camshaft phaser system according to claim 11, wherein each of the plurality of camshaft phasers further comprises a camshaft control unit.

15. The camshaft phaser system according to claim 14, wherein each of the plurality of camshaft phasers further comprises an electric motor.

16. The camshaft phaser system according to claim 15, wherein each of the plurality of camshaft phasers further comprises a harmonic drive.

17. The camshaft phaser system according to claim 16, wherein each of the plurality of camshaft phasers further comprises a data memory.

18. The camshaft phaser system according to claim 15, wherein at least two of the plurality of camshaft phasers are configured as identical parts in hardware and software.

19. The camshaft phaser system according to claim 11, wherein:

each camshaft control unit has a data memory configured to store information as to which one of the plurality of camshafts it is logically assigned to, the first state is defined by a state of indeterminate logical assignment of each camshaft control unit to one of the plurality of camshafts, the second state is defined by a state of determined logical assignment of each camshaft control unit to one of the plurality of camshafts, and the additional signal has information about a determined logical assignment of at least one of the camshaft control units to one of the plurality of camshafts.

* * * * *